US008234006B1

(12) United States Patent
Sachar et al.

(10) Patent No.: US 8,234,006 B1
(45) Date of Patent: Jul. 31, 2012

(54) SORT BIN ASSIGNMENT

(75) Inventors: Divyakaran S. Sachar, Bellevue, WA (US); Amy H. Hsueh, Seattle, WA (US); Patrick W. Ramey, Mountlake Terrace, WA (US)

(73) Assignee: Amazon Technologies, Inc., Reno, NV (US)

( * ) Notice: Subject to any disclaimer, the term of this patent is extended or adjusted under 35 U.S.C. 154(b) by 484 days.

(21) Appl. No.: 12/567,905

(22) Filed: Sep. 28, 2009

(51) Int. Cl.
*G06F 7/00* (2006.01)
*G06F 17/00* (2006.01)

(52) U.S. Cl. ........ 700/216; 700/214; 700/230; 700/242; 700/241; 700/232

(58) Field of Classification Search .................. None
See application file for complete search history.

(56) References Cited

U.S. PATENT DOCUMENTS

| 2006/0206235 A1* | 9/2006 | Shakes et al. | 700/216 |
| 2007/0021863 A1* | 1/2007 | Mountz et al. | 700/214 |
| 2007/0027577 A1* | 2/2007 | Lunak et al. | 700/236 |
| 2008/0183327 A1* | 7/2008 | Danelski | 700/216 |

* cited by examiner

*Primary Examiner* — Gene Crawford
*Assistant Examiner* — Yolanda Jones
(74) *Attorney, Agent, or Firm* — Thomas, Kayden, Horstemeyer & Risley, LLP

(57) ABSTRACT

Disclosed are various embodiments involving assignment and use of sort bins in a materials handling facility. A manifest is generated in at least one computer system that directs a picking of items from inventory locations in a materials handling facility. Each of the items is associated with a corresponding one of a plurality of groups of items. Sort bin assignments are generated for each of the items. Each sort bin assignment specifies a corresponding one of a selected subset of a plurality of sort bins located in a sorting station of the materials handling facility. The selected subset of the sort bins is designated to coalesce together the group of items that includes the respective item for further processing. Each sort bin assignment is based at least in part on a dimension associated with the respective sort bin and at least one attribute associated with the respective item.

20 Claims, 5 Drawing Sheets

SORT BIN ASSIGNMENT

BACKGROUND

In a materials handling facility, it is often the case that orders for goods are fulfilled by pulling items off of shelves, packaging the items, and shipping them to a destination address. In some situations, items for multiple different orders may be combined on a conveyor or in a batch which needs to be sorted in order to package items that are subject to the same order together to ship to a given destination address.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
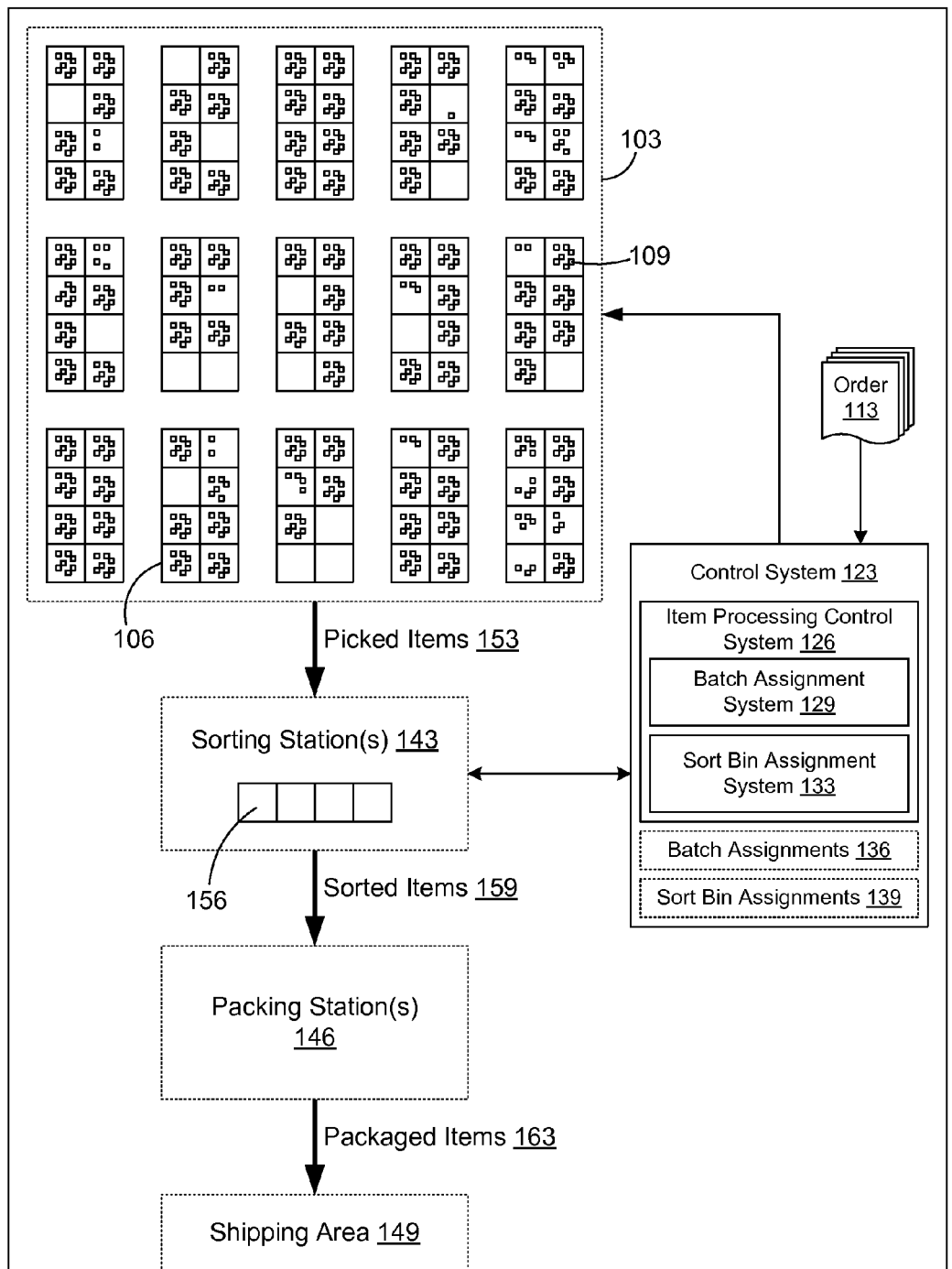
FIG. 1 is a drawing that illustrates the operation of a materials handling facility according to an embodiment of the present disclosure.

With reference to FIG. 1, shown is a drawing that depicts one example of a materials handling facility 100 according to an embodiment of the present disclosure. A materials handling facility 100 may include one or more of, but are not limited to, warehouses, distribution centers, cross-docking facilities, order fulfillment centers (also referred to as fulfillment facilities), packaging facilities, shipping facilities, or other facilities or combination of facilities for performing one or more functions of material (inventory) handling. Although the materials handling facility 100 is described herein with specific reference to a fulfillment center, it is understood that a materials handling facility 100 provides one example of many other types of environments to which the principles described herein apply.

According to the illustration provided herein, the materials handling facility 100 may comprise, for example, a large warehouse or other structure that includes an inventory storage area 103 having a plurality of inventory locations 106. The inventory locations 106 are generally locations configured for the storage of an inventory of items 109. To this end, the inventory locations 106 may comprise, for example, bins, slots, shelves, containers, receptacles, crates, stalls, cribs, cordoned areas, hooks, racks, or other locations, etc. The items 109 are stored in the inventory locations 106 as can be appreciated. The materials handling facility 100 may be configured to provide for the fulfillment of orders 113 received for the purchase of one or more items 109 as will be described.

The items 109 may comprise, for example, products that are purchased by customers through various channels. Such products may be any type of product that can be purchased and delivered to customers such as, for example, clothing items, retail goods, hardware, electronics, toys, media items, edible items, and any other products.

Each order 113 may be characterized as specifying one or more groups of items 109. A group of items 109 may correspond to all of the items 109 purchased in an order 113, or only a subset of the items 109 purchased in the order 113. Also, a group of items 109 may include items 109 from multiple orders 113 that are to receive similar processing. A group of items 109 may represent, for example, a shipment, multiple shipments to a same address, multiple shipments from a same customer but to different addresses, items 109 that are to receive gift wrapping or other special packaging, or any other processing common to the group of items 109.

Associated with the materials handling facility 100 is a control system 123 that orchestrates the operation of the materials handling facility 100 in fulfilling orders 113 for the purchase of items 109 or orders 113 for the movement of items 109 to other materials handling facilities 100 as will be described. To this end, the control system 123 may comprise, for example, one or more processor-based systems such as servers, clients, and/or other systems. The control system 123 may represent multiple servers arranged, for example, in one or more server banks or other arrangements. In one embodiment, the control system 123 may comprise a plurality of processor-based systems that communicate with each other via an appropriate network such as, for example, the Internet, intranets, extranets, wide area networks (WANs), local area networks (LANs), wired networks, wireless networks, or other suitable networks, etc., or any combination of two or more such networks. Such a control system 123 may be located in a single installation or may be dispersed among many different geographical locations. For purposes of convenience, the control system 123 is referred to herein in the singular.

Executed within the control system 123 is an item processing control system 126. Among the various portions of the item processing control system 126 are a batch assignment system 129 and a sort bin assignment system 133. During operation, the batch assignment system 129 may generate batch assignments 136 that relate to the picking of items 109 for a group of one or more orders 113 to be fulfilled. Each order 113 may comprise a group of items 109. Also, a group of items 109 may comprise items 109 from one or more orders 113. Also, the sort bin assignment system 133 may generate sort bin assignments 139 that are stored in a memory for use in guiding an individual who sorts items 109 picked from the inventory storage area 103 as will be described.

Materials handling facility 100 further includes various sorting stations 143, packing stations 146, and shipping areas 149. In some situations, the items 109 from many different orders 113 are picked from the inventory locations 106 and flow as picked items 153 to one or more sorting stations 143. To this end, various batches of groups of items 109 may be picked at the same time and flow together to a given sorting station 143, where the items 109 associated with multiple orders 113 are intermingled on a cart, in totes, or on a conveyor that is received at sorting stations 143. In some situations, only a portion of the items 109 comprising an order 113 arrives at a sorting station 143. This may happen, for example, when an order 113 is to be fulfilled in multiple shipments. The portion of the items 109 may be said to comprise a group of items 109. Such a group of items 109 may be destined for further processing such as, for example, gift wrapping, or some other processing. Each of the sorting stations 143 includes a plurality of sort bins 156 that are used to sort the items 109 so as to coalesce together the items 109 associated with respective ones of the group of items 109 for packing and/or other processing.

The sorted items 159 then flow to packing stations 146 for packing for shipment. Alternatively, sorted items 159 may flow to other processing stations such as, for example, gift wrapping stations to be gift wrapped before being applied to a packing station 146 for packaging for shipment. Once sorted items 159 are packaged, then the packaged items 163 are forwarded to shipping to be placed on transports such as delivery trucks for shipment to destination addresses.

Next, a description of the general operation of materials handling facility 100 is provided according to various embodiments. To begin, the control system 123 receives orders 113 for the purchase of one or more groups of items 109 from an order generation system. Such an order generation system may comprise, for example, an electronic commerce application that facilitates the ordering and purchasing of goods over the Internet or other networks as can be appreciated. Such systems are employed, for example, by on-line merchants that sell their products via an Internet presence. Alternatively, the orders 113 may be generated by telephone through telephone operators. Orders 113 for items 109 may also be generated using kiosks or other order generation systems located in stores or other locations as can be appreciated.

Regardless of how orders 113 for items 109 are generated, the orders 113 are received by the item processing control system 126 that implements processing of the items 109 comprising such orders 113. In doing so, the item processing control system 126 may be configured to execute the batch assignment system 129 and the sort bin assignment system 133 as described above.

Assuming that several orders 113 for items 109 have been received by the item processing control system 126, the batch assignment system 129 then generates one or more manifests that direct the picking of items 109 from various inventory locations 106 in the materials handling facility 100 in fulfillment of the orders 113 for the purchase of the items 109. Each of the manifests may dictate picker routes that individuals known as "pickers" follow through the inventory storage area 103 of the materials handling facility 100 in order to pick items 109 from the inventory locations 106 to be transported as picked items 153 to one or more sorting stations 143.

According to one embodiment, picked items 153 may be provided to the sorting stations 143 in batches as orchestrated by the batch assignment system 129. For example, multiple manifests may orchestrate the picking of items 109 for multiple orders 113, where the carts, totes, or other transport devices include items 109 for multiple different orders 113 and where all the items 109 are associated with a given batch. To this end, it is possible that multiple transport devices such as carts, totes, or other transport devices may include items 109 associated with multiple orders 113 for a given batch. To this end, the picker routes followed by pickers through the inventory storage area 103 to pick the items 109 from the inventory locations 106 may be designed for a maximum efficiency in the route followed by the picker, rather than trying to ensure all items 109 in a given transport device such as a cart or a tote are associated with a single order 113.

Each transport device that includes items 109 associated with a given batch may be designated with a batch identifier. Alternatively, items 109 may be placed on conveyors that move the picked items 153 from the inventory storage area 103 to the sorting station 143 in a continuous stream. To this end, the items 109 associated with a given batch are placed on conveyors so that they end up at the same sorting station 143 together for sorting as will be described. Alternatively, items 109 may be picked without being associated with a batch. In such a case, the items 109 may be shuttled directly to a given one of the sorting stations 143. Ultimately, the transport of picked items 153 is accomplished so that items 109 that are part of the same group of items 109 are provided to the same sorting station 143 to be coalesced together before packing.

Once the item processing control system 126 receives orders 113 for items 109 that are to be fulfilled by the materials handling facility 100, the batch assignment system 129 generates one or more manifests that direct the picking of items 109 and the ultimate flow of items 109 to the sorting stations 143. Alternatively, the manifests may direct the picking of the items 109, where orders 113 for items 109 are not associated with batches.

Thereafter, the sort bin assignment system 133 generates sort bin assignments 139 for each of the items 109 picked that are destined for a given sorting station 143. Each of the sort bin assignments 139 specify a corresponding one of a plurality of sort bins 156 that are designated to coalesce together the items 109 associated with a group of items 109 (for example, an order 113, a shipment within an order 113, a group of items 109 to be gift wrapped, etc.) for processing. To this end, for each group of items 109, one or more sort bins 156 are designated to receive the items 109 associated with a given group of items 109, thereby bringing all of the items 109 together for a group of items 109 in one or more sort bins 156. The sort bins 156 may be designated such that they are adjacent, grouped together, or in close proximity for a given group of items 109. Thereafter, the sorted items 159 may be sent to the packing stations 146 or other processing stations to be packaged or otherwise processed together as a group of items 109.

Thus, the sort bin assignments 139 generated by the sort bin assignment system 133 may be organized in sets, where each set comprises one or more sort bin assignments 139, and each of the sets is associated with a respective one of the orders 113. Ultimately, the sort bin assignments 139 generated are stored in a data store or other memory accessible to the control system 123 for use in sorting the items 109 at a given sorting station 143.

Once items 109 reach a sorting station 143, then the items 109 are sorted using the sort bin assignments 139 after the items 109 have been picked from the inventory locations 106 as described above. For any given item 109 that reaches a sorting station 143, sorting personnel at the sorting station 143 input an identifier associated with the item 109 into the item processing control system 126. Such an identifier may comprise, for example, a batch identifier and/or a product identifier. Such an identifier may be expressed as bar codes or other characters that may be input into the control system 123 using a scanner (such as a hand held scanner), a keyboard, a microphone (for audio input), or other input device as can be appreciated. To this end, the identifiers may comprise, for example, Universal Product Codes (UPC), European Article Numbers (EAN), or other product identification codes.

Upon input of a given identifier associated with a given item 109, the item processing control system 126 proceeds to look up a respective one of the sort bin assignments 139 associated with the item 109 in the memory accessible to the control system 123 based upon the identifier. According to one embodiment, multiple identifiers may be inputted such as, for example, a first identifier associated with a batch for the given item 109 and a second identifier associated with the item 109. The batch identifier may be associated with a cart, tote, or other transport item used to transport the item 109.

Also, the batch identifier may be placed on the item 109 itself in addition to an item identifier such as a UPC code as described above. Based on the one or more identifiers that have been inputted, the control system 123 identifies a respective one of the sort bin assignments 139. Thereafter, the item processing control system 126 proceeds to render the respective sort bin assignment 139 on an appropriate rendering device such as a display device, printer, audio speaker, or other rendering device that directs the placement of the item 109 in a corresponding one of the sort bins 156.

According to one embodiment, the sort bins 156 used to coalesce the items 109 for a particular group of items 109 are adjacent to each other, or at least relatively close to each other, so as to facilitate recognition that all the items 109 in such sort bins 156 belong to the same group of items 109. Further, the sort bins 156 may be disposed on a cart that may be wheeled over to a packing station 146 so that the sorted items 159 in the sort bins 156 of the cart may be accessed by personnel at the packing station 146 for packaging. In such case, items 109 associated with a given group of items 109 may be packaged together where possible as can be appreciated.

Figure 2:
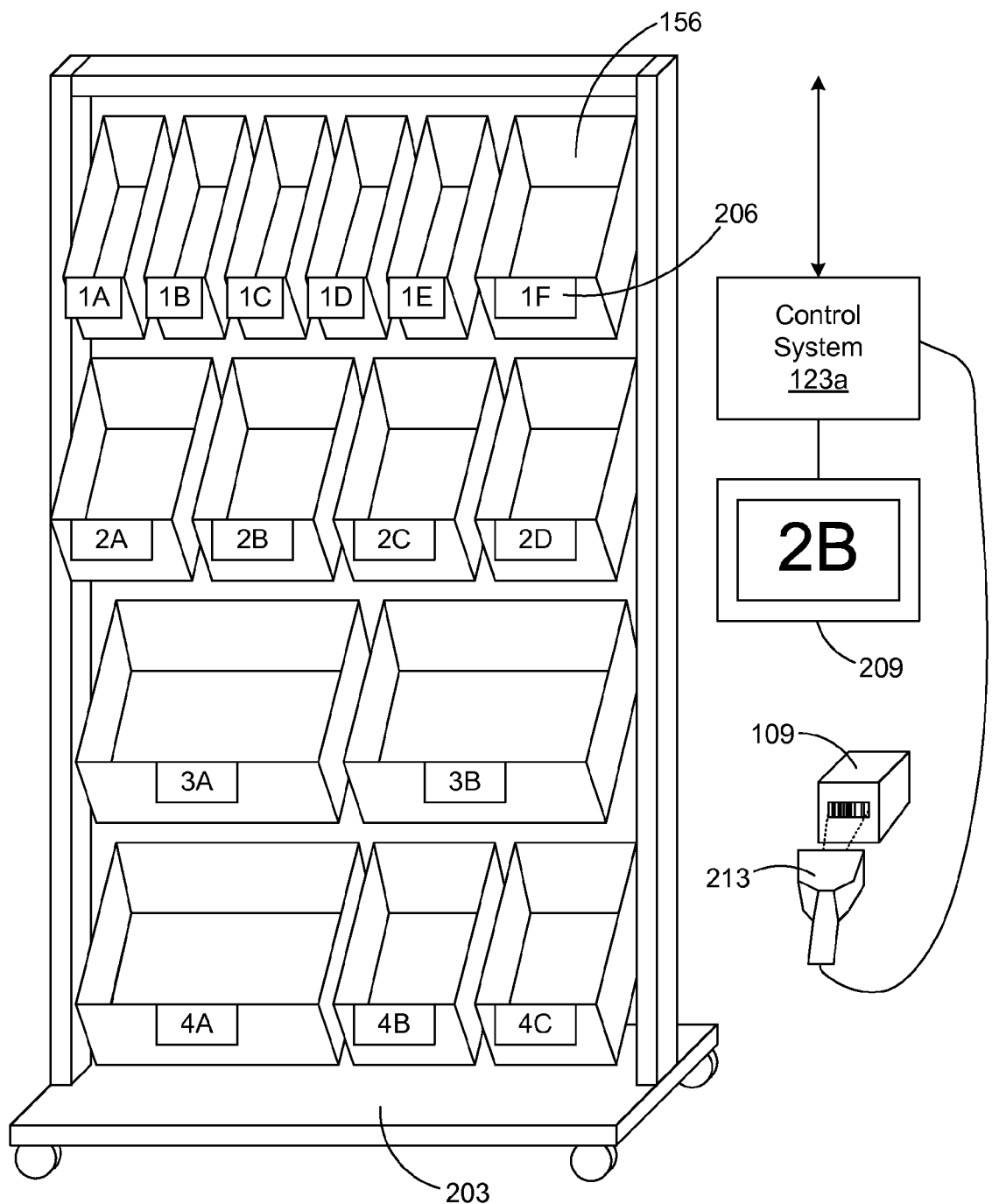
FIG. 2 is a drawing of a sorting station in the materials handling facility of FIG. 1 according to an embodiment of the present disclosure.

Referring next to FIG. 2, shown is one example of a sorting cart 203 that includes a number of sort bins 156. Associated with each of the sort bins 156 may be a bin label 206. Although the sort bins 156 are shown as part of the sorting cart 203, it is also understood that sort bins 156 may be included in a permanent immovable structure such as bins or cubby holes arranged on or in a wall or other structure as can be appreciated. Additionally, sort bins 156 may refer to divided areas within larger bins or cubby holes. As shown in FIG. 2, sort bins 156 may be of different sizes. In other embodiments, the sort bins 156 on a sorting cart 203 may be of the same size. According to one embodiment, the sorting cart 203 provides an advantage in that all of the items 109 (FIG. 1) placed in the sort bins 156 of the sorting cart 203 can be wheeled to the packing stations 146 (FIG. 1) or other processing stations after all items 109 associated with respective orders 113 (FIG. 1) included in the sort bins 156 have been sorted as can be appreciated.

In addition, a portion of the control system 123 (FIG. 1), denoted herein as control system 123a, is associated with the sorting station 143 (FIG. 1). The control system 123a may comprise a client such as a computer system that is linked to the control system 123 via a network, etc. A rendering device 209 such as a display device is employed to display a sort bin assignment 139 (FIG. 1) associated with an item 109 for which one or more identifiers have been input as described above. To this end, an input device 213 such as a scanner may be employed to input the one or more identifiers associated with the item 109. Alternatively, the input device 213 may comprise a keyboard, microphone, or other device.

The sort bin assignment system 133 (FIG. 1) generates the sort bin assignments 139 for the items 109 separately for each group of items 109 within a given batch. Alternatively, the sort bin assignments 139 may be generated separately for each group of items 109 without regard to a batch, where a continuous stream of items 109 is sent to sorting stations 143, for example, on conveyors or via transport device.

The sort bin assignment system 133 may be configured to generate the sort bin assignments 139 for each item 109 associated with a group of items 109 in an order of priority from the least flexible one of the items 109 to the most flexible one of the items 109. As a non-limiting example, the least flexible one of the items 109 may be the largest one of the items 109. In particular, the sort bin assignment system 133 may identify the largest one of the items 109 associated with a given group of items 109 based upon which of the items 109 has the largest single dimension. As another non-limiting example, the least flexible one of the items 109 may be the heaviest one of the items 109, which may require placement in a lower sort bin 156 for safety reasons or so as to minimize the need to lift heavy items 109. As another non-limiting example, items 109 may need to be placed in specific sort bins 156 because the items 109 are fragile, expensive, subject to gift wrapping, or subject to other special processing. It is understood that an item 109 may have other attributes beyond dimensions, weight, or special processing that may limit possible assignments to sort bins 156.

In various embodiments, the sort bin assignment system 133 may be configured to determine one or more (or all) possible solutions for assigning the items 109 of the group of items 109 to sort bins 156. To this end, the sort bin assignment system 133 determines a plurality of sets of potential sort bin assignments 139 for each group of items 109. According to one approach, the sort bin assignment system 133 determines whether all items 109 of the group of items 109 fit into one of the sort bins 156. The sort bin assignment system 133 determines whether an item 109 can fit in a sort bin 156 based at least in part on a volume associated with the respective sort bin 156 and at least one attribute (e.g., volume, dimensions, etc.) associated with the item 109. If all of the items 109 of the group of items 109 fit within a given sort bin 156, the sort bin assignment system 133 stores that solution and may generate sort bin assignments 139 using that solution.

Otherwise, if all of the items 109 do not fit within a given sort bin 156, the sort bin assignment system 133 stores the items 109 that do fit within the given sort bin 156 and then considers all sort bins 156 adjacent to the given sort bin 156 in order to assign the remaining items 109. According to various embodiments, two sort bins 156 may be considered adjacent if the two sort bins 156 are, for example, next to one another, above one another, near one another, etc. The approach repeats for subsequent adjacent sort bins 156 until all of the items 109 can be assigned according to a solution. In some implementations, the sort bin assignment system 133 may assume that the sorting cart 203 and all of its sort bins 156 are unassigned and empty when determining potential solutions.

In one embodiment, the above approach may be implemented in the sort bin assignment system 133, for example, using a tree data structure, wherein the adjacent sort bins 156 are represented as child nodes in the tree. A depth-first traversal of the tree, for example, may be used by the sort bin assignment system 133 in determining whether the remaining items 109 may be assigned to sort bins 156 linked as child nodes in the tree. The tree may be associated with a limit as to depth so that the sort bin assignment system 133 does not consider a set of adjacent sort bins 156 having more sort bins 156 than the limit.

According to the above approach, the sort bin assignment system 133 may consider all possible combinations of adjacent sort bins 156 to which the group of items 109 may be assigned. The sort bin assignment system 133 may store all of the potential solutions for each group of items 109. Thereafter, the sort bin assignment system 133 may rank the groups of items 109 by considering flexibility of assignment, their best solution, weight, and/or other factors.

The ranking of the groups of items 109 may use, for example, the number of sort bins 156 that the group of items 109 requires assuming an empty sorting cart 203, the total volume of the sort bins 156 required by the solution, the total weight of the items 109, and other factors. Additionally, the sort bin assignment system 133 may prefer, for example, that groups of items 109 with a greater number of items 109 be placed in more convenient sort bins 156, that similar item 109 sizes be kept closer together, etc.

The sort bin assignment system 133 may then generate sort bin assignments 139 according to that order, marking a representation of each sort bin 156 as unavailable when it is assigned. In this way, the sort bin assignment system 133 selects one of the sets of potential sort bin assignments 139 as a selected subset of sort bins 156 for each group of items 109. If the sort bins 156 needed for the best solution for a group of items 109 are unavailable, the sort bin assignment system 133 may consider the next best solution for that group of items 109, and so on.

Following the above approach, it may be possible that no set of adjacent sort bins 156 may be found for a particular group of items 109. In such cases, the sort bin assignment system 133 may be configured to retain partial solutions (i.e., sets of sort bins 156 that cannot accommodate all of the items 109 in a group of items 109). The sort bin assignment system 133 may be configured to force an assignment of items 109 to sort bins 156 from a partial solution even though the items 109 are not expected to fit in the sort bins 156 physically. Alternatively, the sort bin assignment system 133 may be configured to assemble a set of non-adjacent sort bins 156 from such partial solutions in generating the sort bin assignments 139 for the group of items 109.

The sort bin assignment system 133 ultimately allocates one or more sort bins 156 for the placement of each item 109 associated with a respective group of items 109. It is possible that sort bins 156 of a given sorting cart 203 or other structure may be filled from the bottom up, from the top down, or filled randomly depending on which items 109 are selected for sorting at any given time. The proximity of the sort bins 156 assigned to be used to coalesce a group of items 109 is such that one may draw an association between the sort bins 156 such that it is more easily recognizable that the products subject to a single group of items 109 are located in the respective sort bins 156. Additionally, within the above approach, whether or not a particular item 109 may be assigned to a particular sort bin 156 may be taken into account so that, for example, a heavy item 109 is not assigned to a sort bin 156 that cannot accept heavy items 109.

Figure 3:
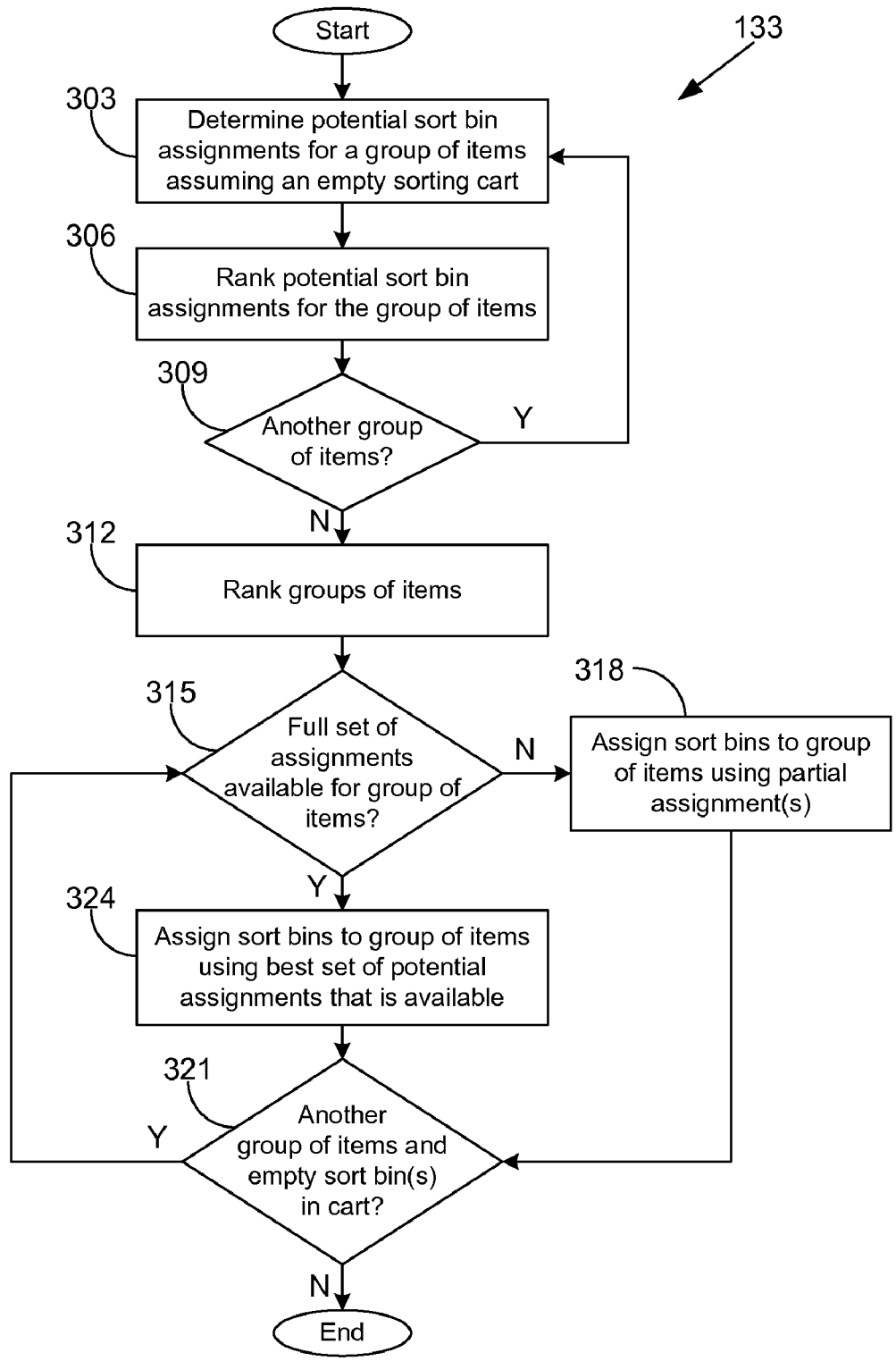
FIGS. 3-5 are flowcharts that provide examples of the operation of components of an item processing control system implemented as portions of an item processing control system of the materials handling facility of FIG. 1 according to an embodiment of the present disclosure.

With reference to FIG. 3, shown is one example of flowchart that illustrates an example of the operation of a portion of the sort bin assignment system 133 (FIG. 1) according to an embodiment of the present disclosure. Alternatively, the flowchart of FIG. 3 may be viewed as depicting steps of a method implemented in the control system 123 (FIG. 1) associated with the materials handling facility 100 (FIG. 1) according to an embodiment of the present disclosure.

To begin, it is assumed that an order 113 (FIG. 1) has been received that identifies one or more items 109 (FIG. 1) to be shipped to a given destination address. In addition, the sort bin assignment system 133 is provided access to data that indicates the physical dimensions and other attributes of the items 109 for the given order 113. The flowchart of FIG. 3 is implemented for each sorting cart 203 (FIG. 2).

Beginning with box 303, the sort bin assignment system 133 determines potential sort bin assignments 139 (FIG. 1) for a group of items 109 assuming an empty sorting cart 203. To this end, the sort bin assignment system 133 may employ, for example, the approach described above in connection with FIG. 2 to determine the potential solutions. The sort bin assignment system 133 may use, for example, a tree data structure, where child nodes are sort bins 156 that are adjacent or proximal to a first sort bin 156, that is, a root node. The sort bin assignment system 133 may employ, for example, a depth first traversal of this tree to obtain full and partial solutions for potential sort bin assignments 139.

Next, in box 306, the sort bin assignment system 133 ranks, or sorts, the potential sort bin assignments 139 for the group of items 109. The ranking criteria may include, but are not limited to, the number of sort bins 156 that the group of items 109 requires assuming an empty sorting cart 203 (FIG. 2), the total volume of the sort bins 156 required by the solution, and other factors. In box 309, the sort bin assignment system 133 determines whether another group of items 109 remains to be processed for determining potential sort bin assignments 139. If so, the sort bin assignment system 133 returns to box 303 and processes another group of items 109. In this way, potential sort bin assignments 139 are generated and ranked for each group of items 109 to be assigned to the sorting cart 203. If no other groups of items 109 remain to be processed, the sort bin assignment system 133 moves to box 312.

In box 312, the sort bin assignment system ranks the groups of items 109 to determine the order in which the groups of items 109 will be assigned to sort bins 156 in the sorting cart 203. As a non-limiting example, the groups of items 109 may be ranked in order of flexibility, from least flexible to most flexible, so that the least flexible groups of items 109 will be assigned first to the sorting cart 203. The ranking may be performed with respect to any number of criteria such as, for example, volume or dimensions of the respective items 109, number of items 109 classed as heavy, total number of items 109, etc.

In box 315, beginning with the first group of items 109 in ranked order, the sort bin assignment system 133 determines whether a full set of sort bin assignments 139 for each item 109 is available for the group of items 109. It may be the case that no full set of sort bin assignments 139 is available for groups of items 109 having special requirements, or when the sorting cart 203 has been largely assigned.

If the sort bin assignment system 133 determines in box 315 that no full set of sort bin assignments 139 is available, the sort bin assignment system 133 moves to box 318 and assigns sort bins 156 to the group of items 109 using available partial sort bin assignments 139. For example, the group of items 109 may be assigned to adjacent sort bins 156 in which the group of items 109 is not expected to fit physically. Alternatively, a group of items 109 may be split among multiple non-adjacent sort bins 156, or even among multiple sorting carts 203. The sort bin assignment system 133 then moves to box 321.

If the sort bin assignment system 133 determines in box 315 that a full set of sort bin assignments 139 is available, the sort bin assignment system 133 instead moves to box 324 and assigns sort bins 156 to the group of items 109 using the best set of potential sort bin assignments 139 that is available. If the first set of the ranked list of potential sort bin assignments 139 for the group of items 109 is unavailable, the sort bin assignment system 133 may then consider the second set, and so on. The sort bin assignment system 133 then moves to box 321.

In box 321, the sort bin assignment system 133 determines whether another group of items 109 remains to be assigned to the sorting cart 203 and whether there are empty sort bin(s) 156 available for assignment in the sorting cart 203. If so, the sort bin assignment system 133 returns to box 315 and begins assigning the next group of items 109 according to the ranked order. If no group of items 109 remains to be processed, then the sort bin assignment system 133 ends. If a group of items 109 remains to be processed but no empty sort bin(s) 156 are available for assignment, the sort bin assignment system 133 also ends. In other embodiments, the sort bin assignment system 133 may proceed to assign a group of items 109 to sort bins 156 with available space, force an assignment to sort bins 156 without available space, or take some other action.

Figure 4:
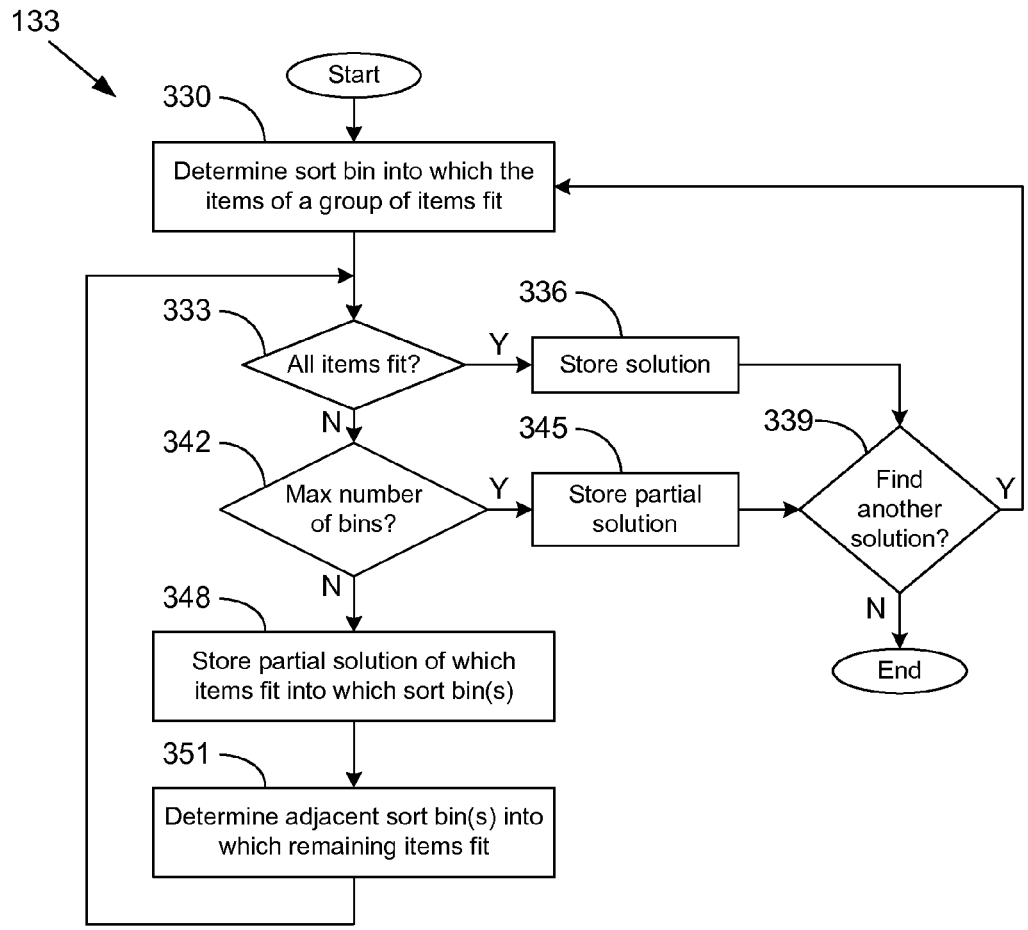

Turning now to FIG. 4, shown is one example of a flowchart that illustrates an example of the operation of a portion of the sort bin assignment system 133 (FIG. 1) according to an embodiment of the present disclosure. Alternatively, the flowchart of FIG. 4 may be viewed as depicting steps of a method implemented in the control system 123 (FIG. 1) associated with the materials handling facility 100 (FIG. 1) according to an embodiment of the present disclosure. In particular, the flowchart of FIG. 4 implements determining a set of potential sort bin assignments 139 (FIG. 1) for a group of items 109 (FIG. 1).

Beginning with box 330, the sort bin assignment system 133 determines a sort bin 156 (FIG. 2) into which the items 109 of a group of items 109 fit. In addition to fit based on the dimensions of the sort bin 156 and of the items 109, the sort bin 156 is chosen to be appropriate for any special attributes associated with the item(s) 109 (e.g., heavy items 109, etc.). In box 333, the sort bin assignment system 133 determines whether all items 109 of the group of items 109 fit in the sort bin 156.

If the sort bin assignment system 133 determines that all items 109 of the group of items 109 fit in the sort bin 156, the sort bin assignment system 133 stores that potential sort bin assignment 139 as a solution in box 336. Then, in box 339, the sort bin assignment system 133 may then determine whether other potential solutions are to be found. If the sort bin assignment system 133 is to look for other potential solutions, the sort bin assignment system 133 moves back to box 330 and determines another sort bin 156 into which the items 109 of a group of items 109 fit. Otherwise, the sort bin assignment system 133 ends.

If the sort bin assignment system 133 determines that not all of the items 109 of the group of items 109 can fit in the sort bin 156, the sort bin assignment system 133 moves to box 342 and determines whether a maximum number of sort bins 156 has been reached in the potential solution. If a maximum number of sort bins 156 has been reached, the sort bin assignment system 133 moves to box 345 and stores the partial solution. In some embodiments, the remaining items 109 of the group of items 109 may be considered to be "dumped" by the sort bin assignment system 133. Next, in box 339, the sort bin assignment system 133 may then determine whether other potential solutions are to be found. If the sort bin assignment system 133 is to look for other potential solutions, the sort bin assignment system 133 moves back to box 330 and determines another sort bin 156 into which the items 109 of a group of items 109 fit. Otherwise, the sort bin assignment system 133 ends.

If the sort bin assignment system 133 instead determines in box 342 that a maximum number of sort bins 156 has not been reached, the sort bin assignment system 133 continues on to box 348 and stores a partial solution determining which items 109 fit into, or can be assigned to, which sort bin(s) 156. Then, in box 351, the sort bin assignment system 133 determines adjacent, or proximal, sort bins 156 into which at least some of the remaining items 109 can fit. Next, the sort bin assignment system 133 proceeds back to box 333, repeating the control flow until a solution is reached and stored or a partial solution is stored.

Figure 5:
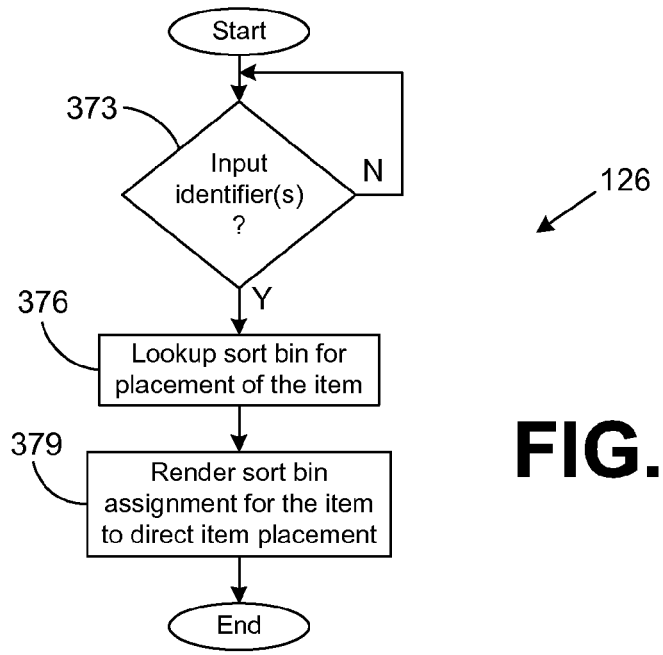

With reference to FIG. 5, shown is a flowchart that depicts an example of functionality included in the item processing control system 126 that directs sorting personnel of a sorting station 143 (FIG. 1) to place items 109 (FIG. 1) in respective sort bins 156 (FIG. 2) based upon the sort bin assignments 139 (FIG. 1) generated before such items 109 are picked. Alternatively, the flowchart of FIG. 5 may be viewed as steps of a method implemented in the control system 123 (FIG. 1) to direct sorting personnel as to the placement of items 109 in respect to one of the sort bins 156.

To begin, the item processing control system 126 determines whether one or more identifiers associated with an item 109 have been input using an appropriate input device 213 (FIG. 2). If such is the case, then the item processing control system 126 proceeds to box 376 in order to look up a respective sort bin assignment 139 for the item 109 based upon the one or more identifiers input into the system. Then, in box 379, the sort bin assignment 139 is sent to the control system 123a (FIG. 2) to be rendered on the rendering device 209 (FIG. 2) as described above. Thereafter, the item processing control system 126 ends as shown.

Figure 6:
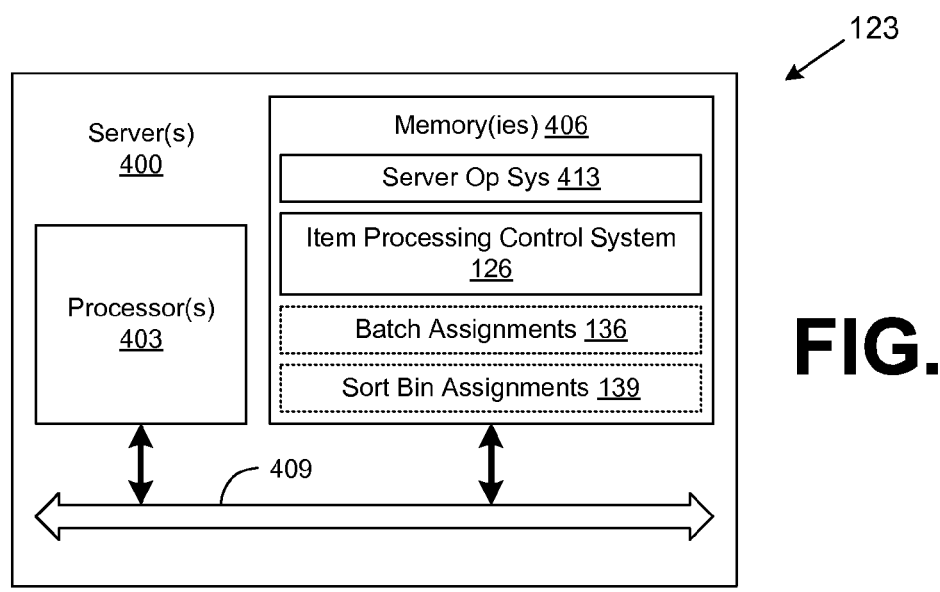
FIG. 6 is a drawing of an example of a server upon which the portions of the item processing control system of FIGS. 3-5 are executed according to an embodiment of the present disclosure.

Referring next to FIG. 6, shown is a schematic block diagram of one example of a portion of the control system 123 that may comprise a server 400 according to an embodiment of the present disclosure. The server 400 includes a processor circuit, for example, having a processor 403 and a memory 406, both of which are coupled to a local interface 409. To this end, the server 400 may comprise, for example, a server computer with such structure. The local interface 409 may comprise, for example, a data bus with an accompanying address/control bus or other bus structure.

While an example of the server 400 is shown as one embodiment of the control system 123, it is understood that the control system 123 may also include other devices such as clients, computer systems, and/or other servers that communicate with the server 400 to implement the various functionality as described above.

Stored in the memory 406 are both data and several components that are executable by the processor 403. In particular, stored in the memory 406 are the item processing control system 126, including the batch assignment system 129 (FIG. 1) and the sort bin assignment system 133 (FIG. 1), the batch assignments 136, the sort bin assignments 139, and other data/components. In addition, a server operating system 413 may be stored in the memory 406 and executed by the processor 403 as can be appreciated.

Also, the batch assignments 136, the sort bin assignments 139, and data may be stored in a data store, for example, in the memory 406 or some other memory accessible to the server 400. It is understood that there may be other applications that are stored in the memory 406 and are executable by the processor 403 as can be appreciated. Also, other data may be stored in the memory 406 and accessed by the processor 403 such as manifest expressing picker routes and/or other data. Where any component discussed herein is implemented in the form of software, any one of a number of programming languages such as, for example, C, C++, Java, Java Script, Perl, Python, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, or source code that may be expressed in proper format such as object code that is capable of being loaded into a random access portion of the memory 406 and executed by the processor 403, etc. An executable program may be stored in any portion or component of the memory 406 including, for example, random access memory, read-only memory, a hard drive, compact disk (CD), floppy disk, or other memory components.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Although various components executed on the server 400 as described above may be embodied in software or code executed by general purpose hardware as discussed above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

The flowcharts of FIGS. 3-5 show the functionality and operation of portions of the item processing control system 126 including the operation of the sort bin assignment system 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the item processing control system 126, including the batch assignment system 129 and the sort bin assignment system 133, and/or any other component implemented in the server 400 as described above comprises software or code, the same can be embodied in any computer-readable medium for use by or in connection with an instruction execution system such as, for example, a processor 403 in a computer system or other system. In this sense, the systems or components executed in the server 400 or other devices may comprise, for example, statements including instructions and declarations that can be fetched from the computer-readable medium and executed by the instruction execution system. In the context of the present disclosure, a "computer-readable medium" can be any medium that can contain, store, or maintain the software or code for use by or in connection with the instruction execution system. The computer readable medium can comprise any one of many physical media such as, for example, electronic, magnetic, optical, electromagnetic, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising the steps of:
generating, in at least one computer system, a manifest that directs a picking of a plurality of items from a plurality of inventory locations in a materials handling facility, each of the items being associated with a corresponding one of a plurality of groups of items;
determining, in the at least one computer system, a plurality of sets of potential sort bin assignments for each group of items;
ranking, in the at least one computer system, the groups of items;
selecting, in the at least one computer system, for each group of items in ranked order, one of the respective sets of potential sort bin assignments as the selected subset of the sort bins for the respective group of items, the sort bins being located in a sorting station in the materials handling facility;
generating, in the at least one computer system, a sort bin assignment for each of the items, each sort bin assignment specifying a corresponding one of the selected subset of the sort bins, the selected subset of the sort bins being designated to coalesce together the group of items that includes the respective item for further processing, each sort bin assignment based at least in part on a dimension associated with the respective sort bin and at least one attribute associated with the respective item; and
storing, in the at least one computer system, the sort bin assignments for use in sorting the items.

2. A method, comprising the steps of:
generating, in at least one computer system, a manifest that directs a picking of a plurality of items from a plurality of inventory locations in a materials handling facility, each of the items being associated with a corresponding one of a plurality of groups of items; and generating, in the at least one computer system, a sort bin assignment for each of the items, each sort bin assignment specifying a corresponding one of a selected subset of a plurality of sort bins located in a sorting station in the materials handling facility, the selected subset of the sort bins being designated to coalesce together the group of items that includes the respective item for further processing, each sort bin assignment based at least in part on a dimension associated with the respective sort bin and at least one attribute associated with the respective item.

3. The method of claim 2, further comprising the steps of:
determining, in the at least one computer system, a plurality of sets of potential sort bin assignments for each group of items; and
ranking, in the at least one computer system, the groups of items;
selecting, in the at least one computer system, for each group of items in ranked order, one of the respective sets of potential sort bin assignments as the selected subset of the sort bins for the respective group of items.

4. The method of claim 3, wherein the ranking is according to flexibility of assignment.

5. The method of claim 3, wherein the ranking is according to a weight associated with each group of items.

6. The method of claim 3, wherein the selected subset of the sort bins is selected based at least in part on a number of sort bins associated with each set of the respective sets of potential sort bin assignments.

7. The method of claim 3, wherein the selected subset of the sort bins is selected based at least in part on a summation of sort bin volumes associated with each set of the respective sets of potential sort bin assignments.

8. The method of claim 2, further comprising the steps of:
storing, in the at least one computer system, the sort bin assignments for use in sorting the items; and
sorting, in the at least one computer system, the items using the sort bin assignments after the items are picked from the inventory locations by performing, for each of the items, the steps of:
inputting an identifier associated with the item into the at least one computer system;
looking up a respective one of the sort bin assignments associated with the item in the at least one computer system based at least in part on the identifier; and
rendering the sort bin assignment to direct the placement of the item in a corresponding one of the sort bins.

9. The method of claim 2, wherein the at least one attribute comprises a weight of the respective item.

10. The method of claim 2, wherein the at least one attribute comprises a dimension of the respective item.

11. The method of claim 2, wherein the selected subset of the sort bins comprises a plurality of sort bins located adjacent to each other in a sorting cart at the sorting station.

12. The method of claim 2, wherein the selected subset of the sort bins comprises a plurality of sort bins of a same size.

13. The method of claim 2, wherein the selected subset of the sort bins comprises a plurality of sort bins of a plurality of sizes.

14. The method of claim 2, wherein the further processing comprises packing.

15. The method of claim 2, wherein the further processing comprises gift wrapping.

16. A system, comprising:
at least one computer system; and
an item processing control system executed in the at least one computer system, the item processing control system comprising:
logic that directs a picking of a plurality of items from a plurality of inventory locations in a materials handling facility, each of the items being associated with a corresponding one of a plurality of groups of items; and
logic that generates a sort bin assignment for each of the items, each sort bin assignment specifying a corresponding one of a selected subset of a plurality of sort bins located in a sorting station in the materials handling facility, the selected subset of the sort bins being designated to coalesce together the group of items that includes the respective item for further processing, each sort bin assignment based at least in part on a dimension associated with the respective sort bin and at least one attribute associated with the respective item.

17. The system of claim 16, wherein the item processing control system further comprises:
logic that determines a plurality of sets of potential sort bin assignments for each group of items, the logic that determines assuming that the sort bins are empty when each set of potential sort bin assignments is determined; and
logic that selects one of the respective sets of potential sort bin assignments as the selected subset of the sort bins for each group of items.

18. The system of claim 17, wherein the selected subset of the sort bins is selected based at least in part on a number of sort bins associated with each set of the respective sets of potential sort bin assignments.

19. The system of claim 17, wherein the selected subset of the sort bins is selected based at least in part on a summation of sort bin volumes associated with each set of the respective sets of potential sort bin assignments.

20. The system of claim 16, wherein the selected subset of the sort bins comprises a plurality of sort bins located adjacent to each other in a sorting cart at the sorting station.

* * * * *